United States Patent
Wood et al.

(10) Patent No.: US 10,331,134 B2
(45) Date of Patent: Jun. 25, 2019

(54) SUPERVISED MOVEMENT OF AUTONOMOUS VEHICLE

(71) Applicant: Uber Technologies, Inc., San Francisco, CA (US)

(72) Inventors: Matthew Shaw Wood, Pittsburgh, PA (US); Scott C. Poeppel, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/800,494

(22) Filed: Nov. 1, 2017

(65) Prior Publication Data

US 2019/0018413 A1 Jan. 17, 2019

Related U.S. Application Data

(60) Provisional application No. 62/532,476, filed on Jul. 14, 2017.

(51) Int. Cl.
| | | |
|---|---|---|
| *G05D 1/00* | (2006.01) | |
| *B60W 50/10* | (2012.01) | |
| *G05D 1/02* | (2006.01) | |
| *B60W 50/14* | (2012.01) | |

(52) U.S. Cl.
CPC .......... *G05D 1/0088* (2013.01); *B60W 50/10* (2013.01); *B60W 50/14* (2013.01); *G05D 1/0214* (2013.01); *B60W 2050/146* (2013.01); *G05D 2201/0213* (2013.01)

(58) Field of Classification Search
CPC ...... B60W 50/10; B60W 50/14; B60W 30/09; B60W 2050/146; G05D 1/0214; G05D 2201/0213
USPC ............................................. 701/2, 3, 23, 28
See application file for complete search history.

(56) References Cited

U.S. PATENT DOCUMENTS

| | | | |
|---|---|---|---|
| 8,768,539 B1 | 7/2014 | Clement et al. | |
| 9,452,754 B2 * | 9/2016 | Clarke | B60W 30/00 |
| 2008/0027591 A1 * | 1/2008 | Lenser | G05D 1/0251 |
| | | | 701/2 |
| 2016/0052514 A1 * | 2/2016 | Clarke | B60W 30/00 |
| | | | 701/28 |

* cited by examiner

*Primary Examiner* — Gertrude Arthur Jeanglaude
(74) *Attorney, Agent, or Firm* — Dority & Manning, P.A.

(57) ABSTRACT

The present disclosure provides systems and methods for controlling autonomous vehicles. In one example implementation, a method includes providing for display to a passenger of an autonomous vehicle, by a computing system having one or more computing devices, a user interface on a display device. The user interface includes at least one interface element associated with directing movement of the autonomous vehicle. The method includes receiving, by the computing system, a user interaction for a time period directed to the interface element. During the time period, the method includes providing, by the computing system, one or more signals indicative of the user interaction to control the autonomous vehicle to autonomously travel along a predetermined path.

19 Claims, 8 Drawing Sheets

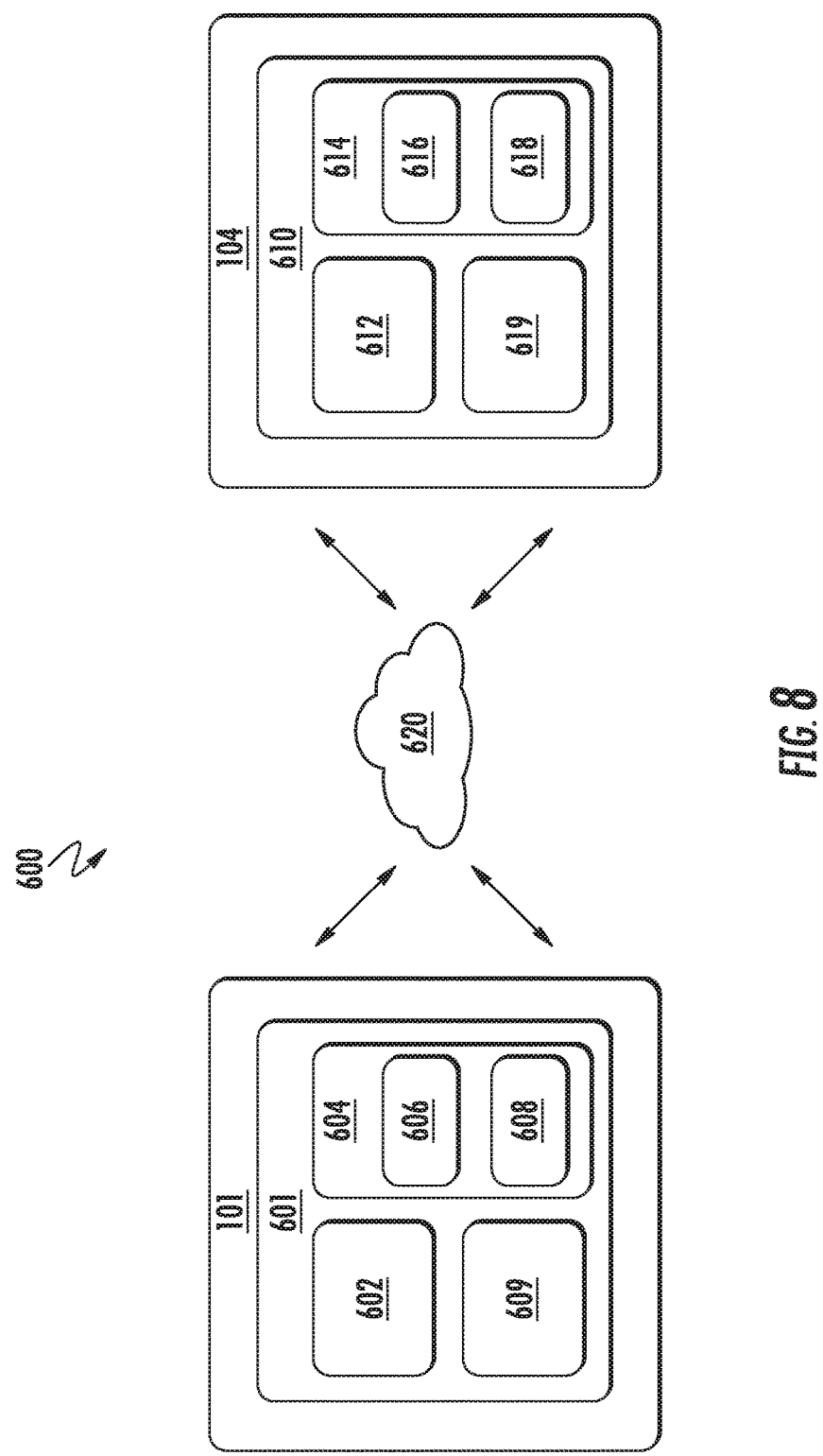

SUPERVISED MOVEMENT OF AUTONOMOUS VEHICLE

PRIORITY CLAIM

The present application claims the benefit of priority of U.S. Provisional Application Ser. No. 62/532,476 titled Supervised Movement of Autonomous Vehicle, filed on Jul. 14, 2017, which is incorporated herein by reference for all purposes.

FIELD

The present disclosure relates generally to autonomous vehicles.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a method for controlling an autonomous vehicle. The method includes providing for display to a passenger of an autonomous vehicle, by a computing system having one or more computing devices, a user interface on a display device. The user interface includes at least one interface element associated with directing movement of the autonomous vehicle. The method includes receiving, by the computing system, a user interaction for a time period directed to the interface element. During the time period, the method includes providing, by the computing system, one or more signals indicative of the user interaction to control the autonomous vehicle to autonomously travel along a predetermined path.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts example system components according to example embodiments of the present disclosure.

DETAILED DESCRIPTION

Figure 1:
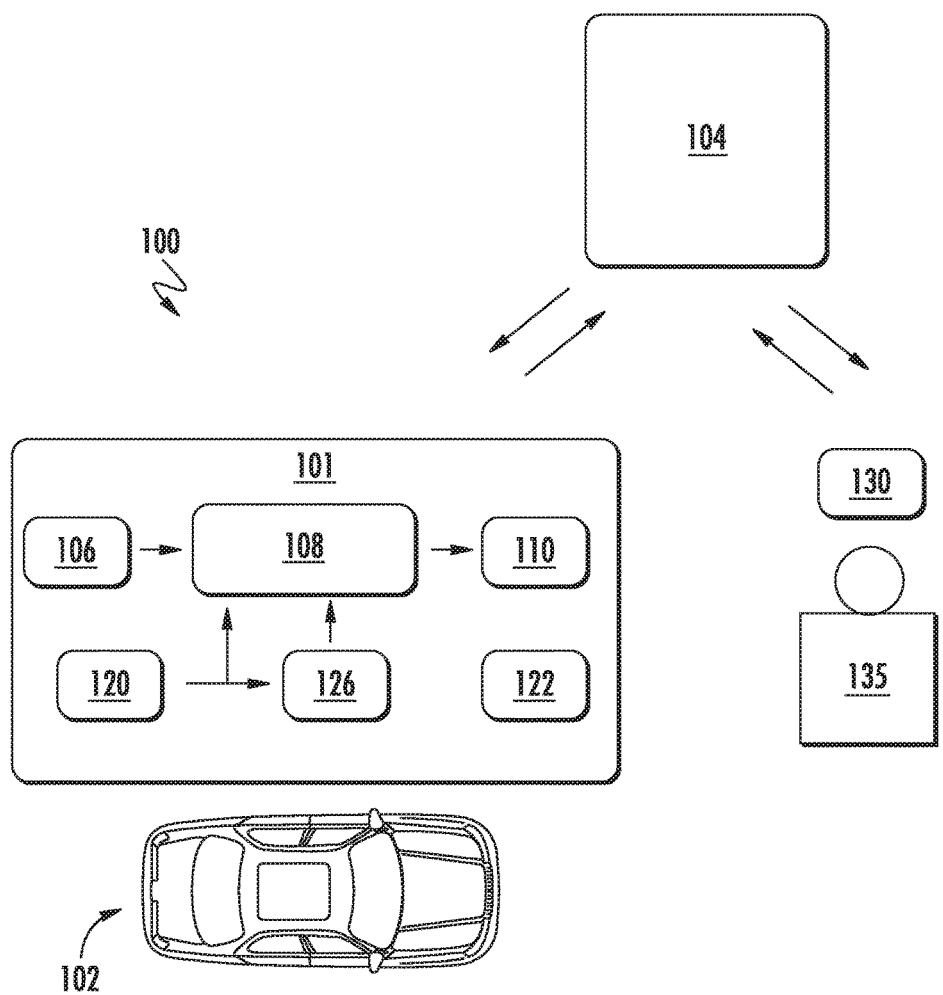
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling movement of autonomous vehicles. Autonomous vehicles can be equipped with autonomous systems that allow the autonomous vehicles to drive, navigate, operate, etc. with no interaction from a human operator. According to example aspects of the present disclosure, movement of an autonomous vehicle can be controlled in a limited manner in certain circumstance based on a user interaction with a user interface to move the autonomous vehicle to a more desirable location. More particularly, a user interface (e.g., a graphical user interface) can be presented on a display device associated with the autonomous vehicle and/or a user device (e.g., a user device carried by a passenger of the autonomous vehicle). The user interface can include an interface element. A passenger or other user (e.g., technician, service provider, etc.) can interact with the interface element (e.g., through a touch interaction) to cause the autonomous vehicle to move along a predetermined path. In this way, the passenger or other user can direct and/or supervise movement of the autonomous vehicle using a simple interaction with user interface.

For instance, in one example implementation, an autonomous vehicle can autonomously travel to a drop off location for a passenger of a vehicle service, such as a ride sharing service or delivery service. The autonomous vehicle may come to a stop at a location on the side of a street where the passenger door is impeded from opening due to an obstacle, such as a tree, fire hydrant, or other obstacle. As another example, the autonomous vehicle can stop at a location where a passenger is required to exit the vehicle in a puddle or other undesirable condition.

In response to detection of this condition, a user interface can be presented on a display device to the passenger. The display device can be associated with a user device (e.g., smartphone or tablet carried by the passenger) and/or can be a display screen located within the autonomous vehicle. The user interface can include an interface element associated with directing movement of an autonomous vehicle. The passenger can interact with the interface element (e.g., via a touch interaction on a touch display screen). As the passenger is interacting with the interface element (e.g., while the passenger persists in touching the interface element), the autonomous vehicle can autonomously move forward along a predetermined path so that the passenger door is no longer impeded by the obstacle. As soon as the autonomous vehicle has moved forward enough for the passenger to open the passenger door, the passenger can stop interacting with the interface element (e.g., stop touching or pressing the interface element) and the autonomous vehicle can stop moving along the predetermined path. The passenger door can then be opened and the passenger can more easily exit the vehicle.

As another example, an autonomous vehicle can experience a technical issue that may impair the ability of the autonomous mode to travel in an autonomous mode. As a result, the autonomous vehicle can enter into a fault mode. In some instances, the autonomous vehicle can come to rest in a traffic lane or other portion of a street while in the fault mode and the vehicle may not be able to move to a different position in full autonomy mode. In response to this condition, a predetermined path for pulling the vehicle further to the side of the road can be determined. A user interface can be presented on a display screen to the passenger. The display screen can be associated with a user device (e.g., smartphone or tablet carried by the passenger) and/or can be a display screen located within the autonomous vehicle. The user interface can include an interface element associated with directing movement of an autonomous vehicle. A passenger or other user can interact with the interface element (e.g., via a touch interaction on a touch display screen). As the passenger or other user is interacting with the interface element (e.g., while the passenger is touching the interface element), the autonomous vehicle can slowly move autonomously along the predetermined path so that the vehicle is safely moved to the side of the street. The autonomous vehicle can be controlled to stop moving along the predetermined path if the passenger or other user stops interacting with the interface element. For example, if the passenger sees a bicycle coming from behind, the passenger can stop interacting with the interface element to prevent the autonomous vehicle from potential impact with the bicycle.

In some embodiments, the user interface can include two or more interface elements. As an example, the user interface can include a first interface element located in a first portion of the user interface (e.g., a bottom left portion of the user interface). The user interface can include a second interface element located in a second portion of the user interface (e.g., a bottom right portion of the user interface). A user can simultaneously interact with the interface elements, for instance, by touching or pressing the first interface element and the second interface elements at the same time. As one example, a user can use a left thumb to touch or press the first interface element and a right thumb to touch or press the second interface element. In response to the simultaneous interaction with both interface elements, the autonomous vehicle can be controlled to move along a predetermined path (e.g., move forward or move to the side of the road). In some embodiments, the autonomous vehicle is only controlled to move along the predetermined path during simultaneous interaction with both the first interface element and the second interface element. In this way, the likelihood of accidental control of the autonomous vehicle via a user interaction with a user interface can be reduced.

In some embodiments, indicia associated with the predetermined path can be displayed in the user interface. For instance, the predetermined path can be displayed in polyline overlaying a graphical representation or image of the area surrounding the vehicle. The graphical representation or image can be from any suitable viewing angle or viewing direction, such as from a top-down perspective, bird's eye perspective, angled perspective, or other perspective. In certain implementations, a graphic indicative of the vehicle can be moved along a polyline representation of the predetermined path in the user interface as the autonomous vehicle is controlled to move along the predetermined path according to example embodiments of the present disclosure.

In some embodiments, the user interface can include an all-clear interface element. For instance, the interface element can include a graphic or other indicia with the text "All Clear." In response to a user interaction with the all-clear interface element, the autonomous vehicle can be controlled to travel completely along the predetermined path without requiring further user interaction. For instance, a passenger or other user (e.g., fleet operator, technician, etc.) can examine the surrounding area of the autonomous vehicle and can determine that the autonomous vehicle can travel along the predetermined path with minimal impact to the surrounding area and the vehicle. The passenger or other user can touch or press the all-clear interface element. In response to the passenger or other user pressing or touching the all-clear interface element, the autonomous vehicle can autonomously travel the entire predetermined path without further user interaction. In this way, the vehicle can be controlled or supervised to a different location without requiring continuous interaction with an interface element as the vehicle is traveling along the predetermined path.

In some embodiments, the autonomous vehicle can be controlled to travel along a predetermined path in response to a user interaction with an interface element such that the autonomous vehicle travels according to a limited operating envelope. The limited operating envelope can limit at least one operating capability of the autonomous vehicle. For instance, the limited operating envelope can restrict at least one of a travel speed, a number of travel maneuvers, a type of travel maneuver, or a travel distance of the autonomous vehicle. In this way, the autonomous vehicle can be more carefully controlled or supervised through user interaction with an interface element presented in a user interface on a display device.

In some embodiments, the user interface presenting the interface element for control of the autonomous vehicle can be displayed on a display device in response to a trigger condition. The trigger condition can be any condition that could warrant the control or supervision of autonomous vehicle movement via a user interface. As discussed above, one example trigger condition can include the vehicle coming to rest at a drop off location where opening of a passenger door is impeded by an obstacle or is otherwise located in an undesirable position (e.g., next to a puddle). This condition can be detected, for instance, using one or more sensors (e.g., cameras, LIDAR systems, etc.) associated with the autonomy system and/or other systems of the vehicle. In response to this condition, a user interface can be presented to the passenger or other use. The user interface can allow the user to move the vehicle forward or backward along a predetermined path through interaction with one or more interface elements presented as part of the user interface. In some implementations, the trigger condition can be any instance in which the autonomous vehicle comes to a stop to drop off a passenger to give the passenger flexibility to adjust the drop off location by moving the autonomous vehicle slightly forward or backward through interaction with the user interface.

In some embodiments, the trigger condition can be associated with the autonomous vehicle entering a fault mode. An autonomous vehicle can enter a fault mode of operation when one or more systems on the autonomous vehicle are no longer working properly. For instance, an autonomous vehicle can enter a fault mode if one or more sensors used as part of an autonomy system for the vehicle become damaged or otherwise unsuitable for autonomous travel of the vehicle. When in a fault mode, the vehicle autonomy system can determine a stopped position for the autonomous vehicle based, at least in part, on the fault and one or more travelling conditions (e.g., heading, speed, position, geographic location, road structure, or the like) associated with the vehicle. For example, in the event that the fault is severe and the vehicle is travelling on a road without a shoulder section, the vehicle autonomy system may select a stopped position in the current driving lane of the vehicle. However, in the event that the vehicle is traveling in a right-hand lane of a highway with a shoulder section, the vehicle computing system may select a stopped position out of the current driving lane (e.g., on the shoulder).

However, it may be desirable for the vehicle to be moved further to the side of the road so that it has less impact on traffic. In response to the vehicle entering a fault mode, a user interface can be presented to the user. The user interface can allow the user to move the vehicle along a predetermined path further to the side of the road through interaction with one or more interface elements presented as part of the user interface. Thus, systems and methods of the present disclosure can allow for limited human override of autonomous decision making.

In some embodiments, the predetermined path can be determined in response to the trigger condition. For instance, when the trigger condition is associated with the vehicle coming to rest with the passenger door in an undesirable location, the predetermined path can be determined to be a path where the autonomous vehicle moves a few feet forward or backward. When the trigger condition is associated with a fault condition, the predetermined path can be determined to be a path for the autonomous vehicle to reach a clear zone (e.g., further to the side of the road) or other designated area (e.g., a path determined to guide the autonomous vehicle onto the back of a tow truck).

In some embodiments, the user interface can be presented to a passenger or other user only under certain conditions. As an example, the user interface can be presented on a display device associated with a passenger device only when it is determined that a passenger is located in the vehicle. Alternatively, the user interface can be presented on a display device associated with a passenger device only when it is determined that the passenger is located outside the vehicle. The passenger location can be determined in any suitable manner, such as using one or more in-vehicle sensors (e.g., motion sensors, seat sensors that determine whether a passenger is present in a seat of the vehicle, etc.). In some embodiments, passenger location can be determined based on the location of a user device (e.g., smartphone, tablet, wearable) relative to the autonomous vehicle. In this way, the location of the passenger or other user can be taken into account in determining whether to provide the passenger or other user the ability to control or supervise the autonomous vehicle via the user interface according to example aspects of the present disclosure.

In some embodiments, certain control devices associated with the autonomous vehicle can be locked or otherwise prevented from controlling movement of the autonomous vehicle while the autonomous vehicle is being controlled via user interaction with the user interface according to example embodiments of the present disclosure. For instance, a steering wheel associated with autonomous vehicle can be locked or prevented from affecting movement of the autonomous vehicle while the autonomous vehicle is being controlled to move along a predetermined path in response to a user interaction with an interface element presented on the user interface. This can help prevent unwanted user interference with the autonomous vehicle while the vehicle is being controlled according to example embodiments of the present disclosure.

The system and methods described herein may provide a number of technical effects and benefits. For instance, in some implementations, a user interface according to example aspects of the present disclosure can allow for a user to control or supervise movement of an autonomous vehicle under certain conditions with a simple user interaction with an interface element. This can preserve processing and/or memory resources dedicated to receiving user input and vehicle commands for controlling the autonomous vehicle by reducing the number of inputs or other parameters required to control or supervise the autonomous vehicle. In addition, controlling the movement of the autonomous vehicle along a predetermined path according to example aspects of the present disclosure may help prevent the autonomous vehicle from having to make unnecessary travel maneuvers to move to a different location. Moreover, the systems and methods of the present disclosure can provide for the limited human control of an autonomous vehicle to move the vehicle to a more desirable location in a risk-reduced manner.

Systems and methods of the present disclosure can provide an improvement to autonomous vehicle computing technology. For instance, systems and methods can provide for controlling or supervising movement of an autonomous vehicle via simple interaction with a user interface. This can facilitate movement of the autonomous vehicle in certain conditions, such as when operating in a fault mode or in otherwise diminished capacity. Providing the ability of a passenger or other user to control or supervise movement of the autonomous vehicle for a limited distance along a predetermined path via interaction with a user interface can preserve processing and storage resources of the autonomous vehicle. These processing and storage resources can be preserved for other functions of the autonomous vehicle.

As used herein, the singular forms "a," "an," and "the" include plural unless the context clearly dictates otherwise. The use of the term "about" in conjunction with a numerical value refers to within 20% of the stated amount. The terms "first", "second", and "third" may be used interchangeably to distinguish one component from another and are not intended to signify location, order, or importance of the individual components. "Obtaining" data can include receiving, determining, calculating, accessing, reading or otherwise obtaining data.

With reference now to the FIGS., example embodiments of the present disclosure will be discussed in further detail. FIG. 1 depicts an example system 100 according to example embodiments of the present disclosure. The system 100 can include an autonomous system 101 associated with a vehicle 102 and an operations computing system 104 that is remote from the vehicle 102. FIG. 1 depicts one example autonomous vehicle system according to example embodiments of the present disclosure. Those of ordinary skill in the art, using the disclosures provided herein, will understand that aspects of the present disclosure can be implemented with other autonomous vehicle systems without deviating from the scope of the present disclosure.

The vehicle 102 incorporating the autonomous system 101 can be a ground-based autonomous vehicle (e.g., car, truck, bus) or other type of vehicle. The vehicle 102 can be an autonomous vehicle that can, in certain modes of operation, drive, navigate, operate, etc. with minimal and/or no interaction from a human driver. For example, the vehicle 102 can operate semi-autonomously with some interaction from a human driver present in the vehicle 102. The vehicle 102 can be configured to operate in a fully autonomous manner (e.g., self-driving manner) such that the vehicle 102 can drive, navigate, operate, etc. with no interaction from a human driver. The vehicle 102 can be configured to operate in a non-autonomous manner such that the vehicle is driven by a human driver with little to no assistance from an autonomous system.

As shown in FIG. 1, the vehicle 102 can include one or more data acquisition systems 106, an autonomous computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisition system(s) 106 can be configured to obtain sensor data associated with one or more objects that are proximate to the vehicle 102 (e.g., within a field of view of one or more of the data acquisition system(s) 106). The data acquisitions system(s) 106 can include, for instance, a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data can include image data, radar data, LIDAR data, and/or other data acquired by the data acquisition system(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s) within the surrounding environment of the vehicle 102 at one or more times. The data acquisition system(s) 106 can provide the sensor data to the autonomous computing system 108.

In addition to the sensor data, the autonomous computing system 108 can retrieve or otherwise obtain map data associated with the surroundings of the vehicle 102. The map data can provide detailed information about the surrounding environment of the vehicle 102. For example, the map data can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomous computing system 108 can receive the sensor data from the data acquisition system(s) 106, comprehend the surrounding environment by performing various processing techniques on data collected by the data acquisition system(s) 106, and generate an appropriate motion plan through such surrounding environment. The autonomous computing system 108 can control the one or more vehicle control systems 110 to operate the vehicle 102 according to the motion plan.

The vehicle 102 can include one or more vehicle component sensors 120 associated with various vehicle components. The vehicle component sensor(s) 120 can include load/weight sensors, audio sensors, temperature sensors, vibration sensors, motion sensors, and/or other types of sensors that are configured to detect a change in status associated with a vehicle component. The autonomous computing system 108 can be configured to determine a motion plan for the vehicle 102 based at least in part on the one or more signals from the vehicle component sensors 120. In addition, the vehicle control system 110 can control one or more vehicle components according to the motion plan based on feedback signals from the vehicle component sensor(s) 120.

The vehicle 102 can include a communications system 122 configured to allow the autonomous system 101 (and its computing device(s)) to communicate with other computing devices. The autonomous system 101 can use the communications system 122 to communicate with the operations computing system 104, a user device 130 associated with passenger 135 and/or one or more other remote computing device(s) over the network(s) (e.g., via one or more wireless signal connections). In some implementations, the communications system 122 can allow communication among one or more of the system(s) on-board the vehicle 102. The communications system 122 can include any suitable components for interfacing with one or more network(s), including, for example, transmitters, receivers, ports, controllers, antennas, or other suitable components that can help facilitate communication with one or more remote computing device(s) that are remote from the vehicle 102.

The vehicle 102 can include one or more user-facing computing devices 126 to help control the vehicle 102 based on a passenger-initiated action. The computing device(s) 126 can be, for instance, a tablet, mobile device, display with one or more processors, etc. The computing device(s) 126 can include a display for presenting interface(s) (e.g., GUIs) to a user. As will be discussed in detail below, in some embodiments, the computing device(s) 126 can present a user interface on a display device that includes an interface element that allows a user (e.g., a passenger of the autonomous vehicle) to control movement of the autonomous vehicle.

The computing device(s) 126 can be included with and/or separate from the autonomous computing system 108 and/or its sub-systems. The computing device(s) 126 can be configured to communicate with one or more of the other components of the vehicle 102 (e.g., of the autonomous system 101). The computing device(s) 126 can include various components for performing various operations and functions. For instance, the computing device(s) 126 can include one or more processor(s) and one or more one or more tangible, non-transitory, computer readable media, each of which are on-board the vehicle 102. The one or more one or more tangible, non-transitory, computer readable media can store instructions that when executed by the one or more processor(s) cause the one or more processor(s) to perform operations and functions.

The autonomous system 101 and/or the operations computing system 104 can communicate with a user device 130 associated with a passenger 135 or other user of the autonomous vehicle. The user device 130 can be, for instance, a smartphone, tablet, laptop, wearable device, display with one or more processors, or other computing device. In some embodiments, the user device 130 can be capable of being carried by a user (e.g., in the user's hand) while in operation. The user device 130 can include one or more processors and one or more memory devices. The user device 130 can include a display device (e.g., a touchscreen) for presenting information (e.g., a graphical user interface) to the passenger 135. As will be discussed in detail below, in some embodiments, the user device 130 can present a user interface on a display device that includes an interface element that allows a user (e.g., a passenger of the autonomous vehicle) to control movement of the autonomous vehicle.

Figure 2:
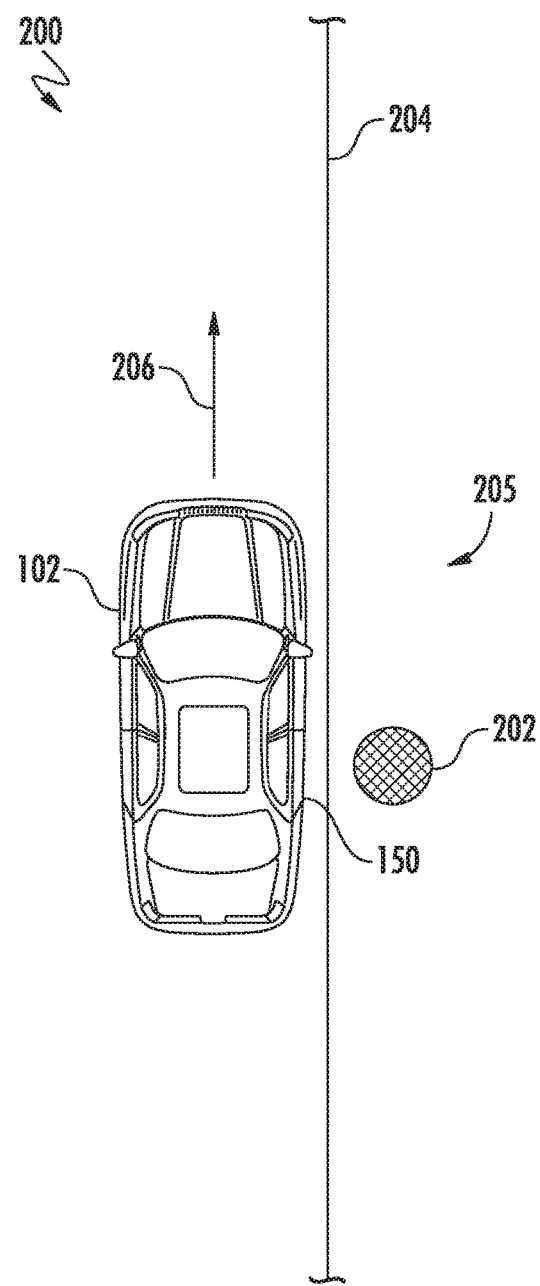
FIG. 2 depicts example control of an autonomous vehicle stopped at a location where opening of a passenger door may be impeded by an obstacle according to example embodiments of the present disclosure.

FIG. 2 depicts an example autonomous vehicle 102 that has come to rest after traveling in an autonomous mode to a passenger drop off location 205 proximate to a curb 204 on the side of a road 200. The passenger drop off location 205 can be associated with a drop off location determined for the passenger as part of a vehicle service (e.g., a ridesharing service). As illustrated, a vehicle door 150 of the autonomous vehicle is impeded from opening by obstacle 202 at the drop off location 205. The obstacle 202 can be, for instance, a telephone pole, fire hydrant, mailbox, signage, pedestrian, bicycle rack, or other object. The obstacle 202 can prevent the vehicle door 150 from opening to allow the passenger to exit the autonomous vehicle 102.

According to example aspects of the present disclosure, the autonomous vehicle 102 can be controlled to move (e.g., according to a limited operating envelope) to travel along path 206 to move the vehicle 102 forward so that the vehicle door 150 is no longer impeded from opening by obstacle 202. More particularly, a user interface can be presented on a display device to a user (e.g., the passenger of the autonomous vehicle). The user interface can include one or more interface elements. When the user interacts with the interface elements, the autonomous vehicle 102 autonomously travels along path 206 to move the autonomous vehicle a few feet forward so that the vehicle door 150 is no longer impeded from opening by obstacle 202.

Figure 3:
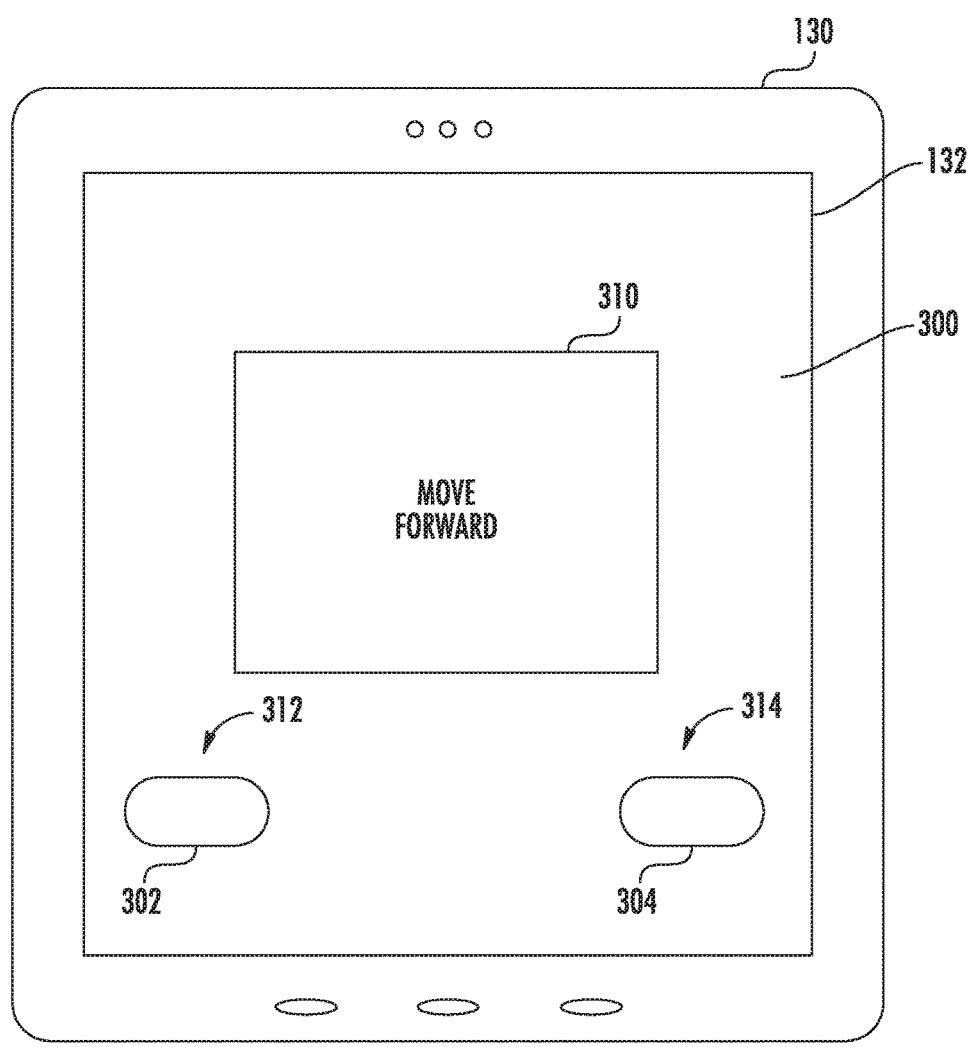
FIG. 3 depicts an example user interface that can be presented on a display device for control of an autonomous vehicle according to example embodiments of the present disclosure.

FIG. 3 depicts one example user interface 300 that can be provided for display on a display device according to example embodiments of the present disclosure in response to the autonomous vehicle coming to rest in front of an obstacle or other trigger condition (e.g., any time the autonomous vehicle comes to rest). The user interface 300 is illustrated as being provided for display on a display device 132 (e.g., a touch screen) associated with a user device 130 for example purposes. Those of ordinary skill in the art, using the disclosures provided herein, will understand that the user interface 300 can be presented for display on other devices, such as user-facing vehicle computing device 126.

As shown, the user interface 300 includes a first interface element 302 (e.g., graphic, button, icon, or other element) located in a first portion 312 of the user interface 300. The user interface 300 includes a second interface element 304 (e.g., graphic, button, icon, or other element) in a second portion 314 of the user interface 300. The user interface 300 can also include a text box 310 that presents text informing the user (e.g., the passenger) that the passenger can interact with the user interface to move the vehicle along a path. The text can provide information associated with the path (e.g., moving the vehicle forward or moving the vehicle backward).

In some embodiments, the user can interact with the text box 310 to select a particular movement or predetermined path for the autonomous vehicle. For instance, a user can touch the text box 310 to toggle the path between moving the autonomous vehicle forward and moving the autonomous vehicle backward.

A user (e.g., a passenger) can interact with the first interface element 302 and/or the second interface element 304 to control the autonomous vehicle to move the autonomous vehicle. A user can interact with the first interface element 302 by touching or pressing the first interface element 302. A user can interact with the second interface element 304 by touching or pressing the second interface element 304.

As will be discussed in detail below, upon user interaction with the first interface element 302 and/or the second interface element 304, the autonomous vehicle can be controlled to move along a predetermined path (e.g., forward or backward). More particularly, while the user persists in touching or pressing the first interface element 302 and/or the second interface element 304, the vehicle can be controlled to move forward or backward until the vehicle door is no longer impeded from opening by an obstacle. If the passenger releases or stops interacting with the first interface element 302 and/or second interface element 304, the vehicle can stop moving along the path.

In some embodiments, the autonomous vehicle can be controlled to travel according to a limited operating envelope in response to user interaction with the first interface element 302 and/or the second interface element 304. The limited operating envelope can limit at least one operating capability of the autonomous vehicle. For instance, the limited operating envelope can restrict at least one of a travel speed, a number of travel maneuvers, a type of travel maneuver, or a travel distance of the autonomous vehicle. In one example, the limited operating envelope can restrict the travel speed of the autonomous vehicle to less than 10 miles per hour (MPH), such as less than 5 MPH, such as less than 2 MPH, such as less than 1 MPH. In this way, the autonomous vehicle can be more carefully controlled or supervised through user interaction with one or more of the interface elements 302 and 304 presented on the user interface 300.

In some embodiments, simultaneous interaction with both the first interface element 302 and the second interface element 304 can be required to control the autonomous vehicle to move forward or backward along a path. This can require more deliberate action from the user to control the autonomous vehicle. As illustrated in FIG. 3, the first interface element 302 is included in a lower left portion of the user interface 300. The second interface element 304 is included in a lower right portion of the user interface 300. This can facilitate simultaneous interaction with both the first interface element 302 and the second interface element 304 (e.g., with the user's thumbs on each hand).

Figure 4:
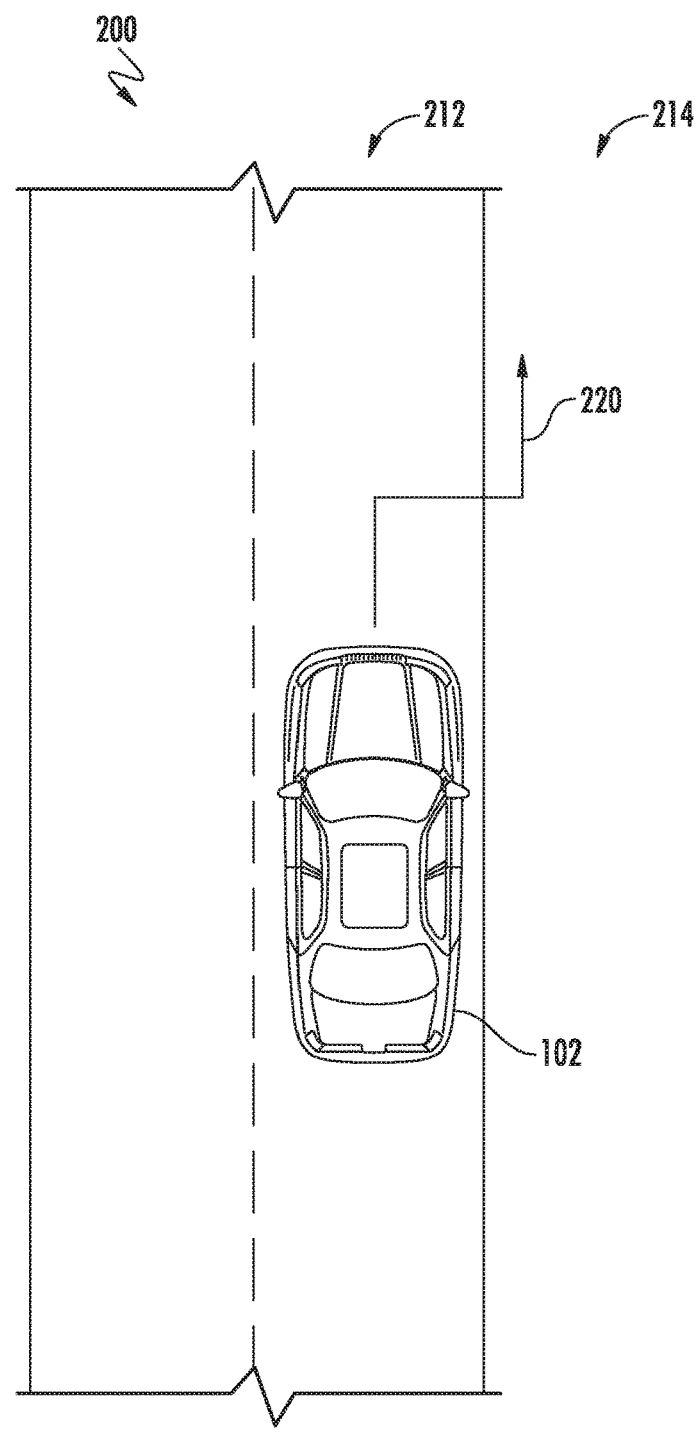
FIG. 4 depicts example control of an autonomous vehicle in a fault mode according to example embodiments of the present disclosure.

FIG. 4 depicts an example autonomous vehicle 102 that has come to rest while in a fault mode. A fault mode can occur during any condition that limits the capability of the autonomous vehicle to travel in a fully autonomous mode. As shown the autonomous vehicle 102 has come to rest in a traffic land 212 on a road 200. It can be desirable to control the vehicle to move along path 220 so that the autonomous vehicle is moved to the side portion 214 of the road 200 (e.g., the shoulder).

According to example aspects of the present disclosure, the autonomous vehicle 102 can be controlled to move (e.g., according to a limited operating envelope) to travel along path 220 to move the vehicle 102 to the side portion 214 of the road 200 when in the fault mode. More particularly, a user interface can be presented on a display device to a user (e.g., the passenger of the autonomous vehicle). The user interface can include one or more interface elements. When the user interacts with the interface elements, the autonomous vehicle 102 autonomously travels along path 220 to move the autonomous vehicle 102 along path 220 to the side portion 214 of the road 200.

Figure 5:
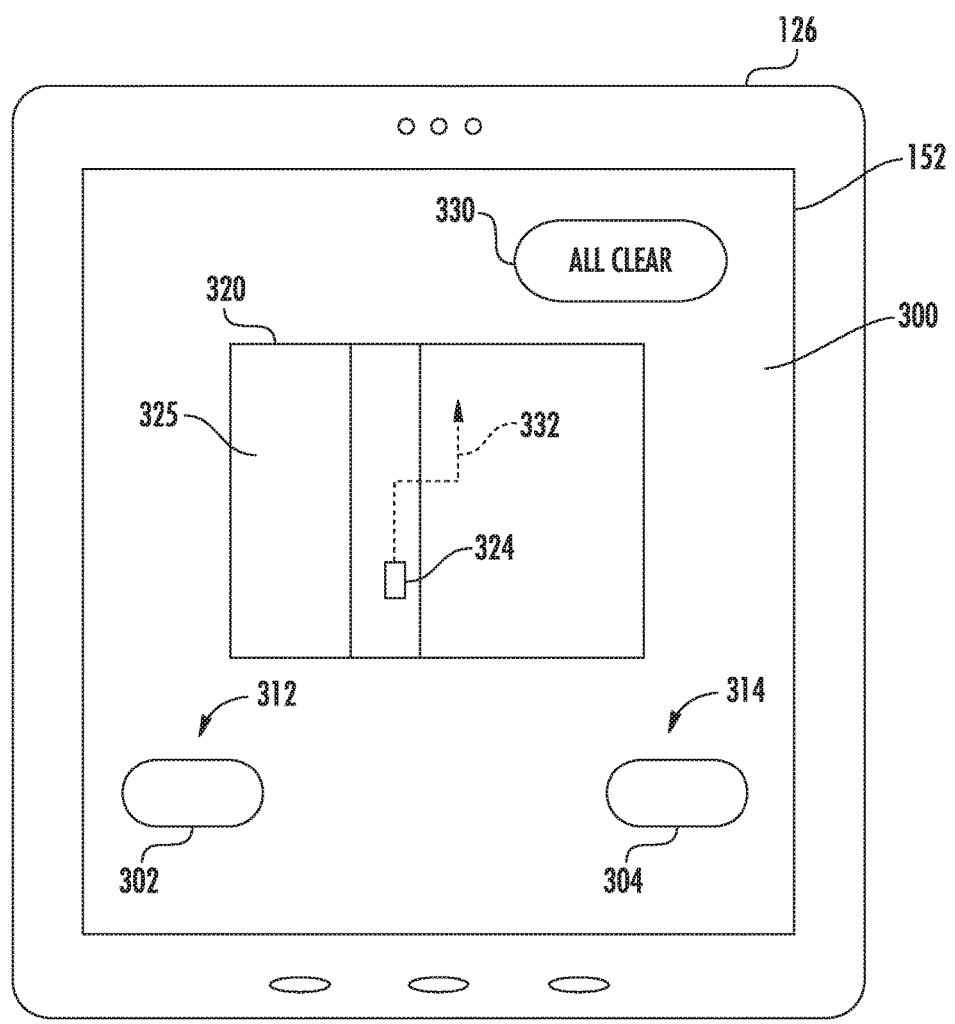
FIG. 5 depicts an example user interface that can be presented on a display device for control of an autonomous vehicle according to example embodiments of the present disclosure.

FIG. 5 depicts one example user interface 300 that can be provided for display on a display device according to example embodiments of the present disclosure in response to the fault condition shown in FIG. 4 or other trigger. The user interface 300 is illustrated as being provided for display on a display device 152 (e.g., a touch screen) associated with a vehicle-facing computing device 126 that is included as part of the autonomous vehicle for purposes of illustration and discussion. Those of ordinary skill in the art, using the disclosures provided herein, will understand that the user interface 300 can be presented for display on other devices, such as user device 130.

As shown, the user interface 300 includes a first interface element 302 (e.g., graphic, button, icon, or other element) located in a first portion 312 of the user interface 300. The user interface 300 includes a second interface element 304 (e.g., graphic, button, icon, or other element) in a second portion 314 of the user interface 300. A user (e.g., a passenger) can interact with the first interface element 302 and/or the second interface element 304 to control the autonomous vehicle to move the autonomous vehicle along a predetermined path. The predetermined path can be a path determined to move the vehicle to a side of the road. In some embodiments, the predetermined path can be determined in response to the vehicle entering a fault mode.

A user can interact with the first interface element 302 by touching or pressing the first interface element 302. A user can interact with the second interface element 304 by touching or pressing the second interface element 304. Upon user interaction with the first interface element 302 and/or the second interface element 304, the autonomous vehicle can be controlled to move along a predetermined path (e.g., forward or backward). More particularly, while the user persists in touching or pressing the first interface element 302 and/or the second interface element 304, the vehicle can be controlled to move forward or backward until the vehicle door is no longer impeded from opening by an obstacle. If the passenger releases or stops interacting with the first interface element 302 and/or second interface element 304, the vehicle can stop moving along the predetermined path.

In some embodiments, the autonomous vehicle can be controlled to travel according to a limited operating envelope in response to user interaction with the first interface element 302 and/or the second interface element 304. The limited operating envelope can limit at least one operating capability of the autonomous vehicle. For instance, the limited operating envelope can restrict at least one of a travel speed, a number of travel maneuvers, a type of travel maneuver, or a travel distance of the autonomous vehicle. In one example, the limited operating envelope can restrict the travel speed of the autonomous vehicle to less than 10 miles per hour (MPH), such as less than 5 MPH, such as less than 2 MPH, such as less than 1 MPH. In this way, the autonomous vehicle can be more carefully controlled or supervised through user interaction with one or more of the interface elements 302 and 304 presented on the user interface 300.

In some embodiments, simultaneous interaction with both the first interface element 302 and the second interface element 304 can be required to control the autonomous vehicle to move forward or backward along a path. This can require more deliberate action from the user to control the autonomous vehicle. As illustrated in FIG. 5, the first interface element 302 is included in a lower left portion of the user interface 300. The second interface element 304 is included in a lower right portion of the user interface 300. This can facilitate simultaneous interaction with both the first interface element 302 and the second interface element 304 (e.g., with the user's thumbs on each hand).

The user interface 300 can also include a viewport 320. The viewport 320 can present a graphical representation 325 or image of the area surrounding the autonomous vehicle. The graphical representation 325 or image can be from any suitable viewing angle or viewing direction, such as from a top-down perspective, bird's eye perspective, angled perspective, or other perspective. Indicia 322 associated with the predetermined path can be presented overlaying the graphical representation 325 or image of the area surrounding the autonomous vehicle. The indicia 322 can be a polyline representation of the predetermined path. A graphic 324 indicative of the vehicle can be moved along the indicia 322 as the autonomous vehicle is controlled to move along the predetermined path via interaction with the first interface element 302 and/or the second interface element 304 according to example embodiments of the present disclosure. In this way, the user interface 300 can provide feedback to a user indicative of vehicle position along the predetermined path while the user is controlling the autonomous vehicle through interaction with the first interface element 302 and/or the second interface element 304.

The user interface 300 additionally includes an all-clear interface element 330. The all-clear interface element 330 can include a graphic, button, icon or other element with the text "All Clear." In response to a user interaction with the all-clear interface element 330, the autonomous vehicle can be controlled to travel completely along the predetermined path without requiring further user interaction, such as interaction with interface elements 302 and elements 304.

Figure 6:
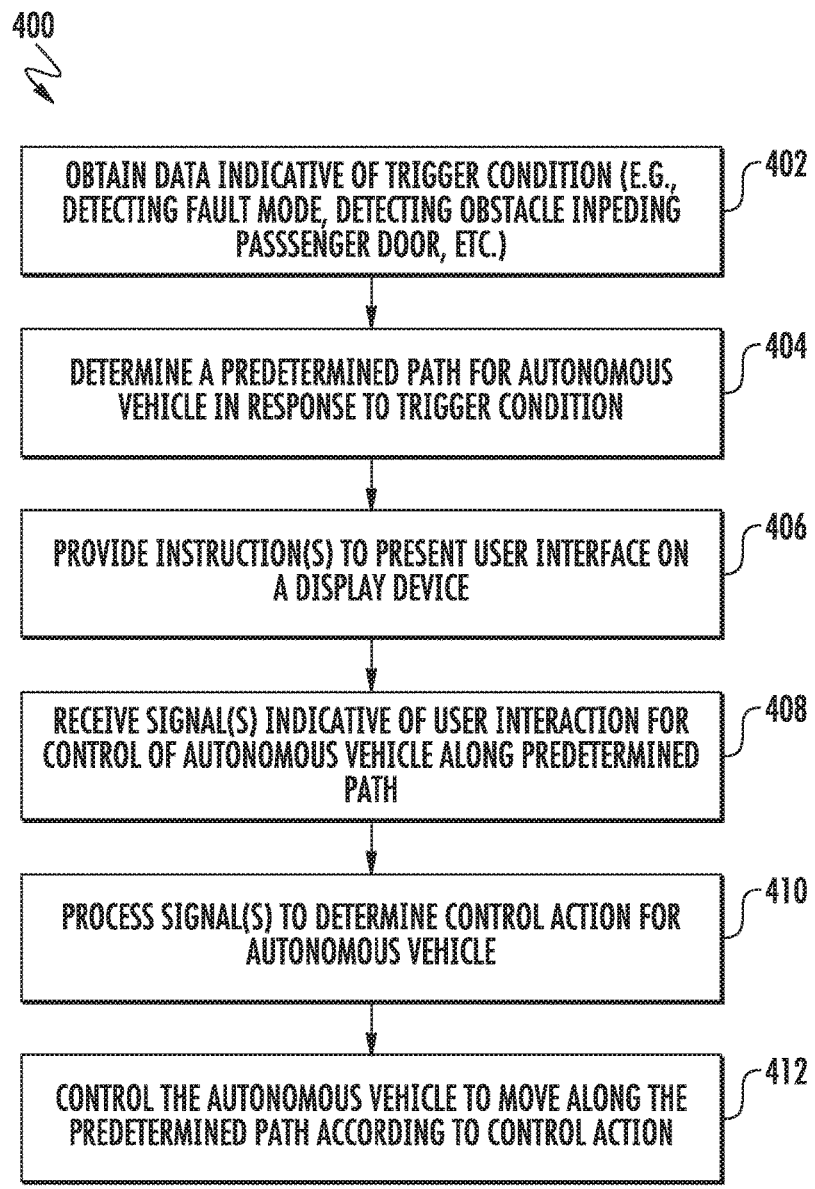
FIG. 6 depicts a flow diagram of an example method according to example embodiments of the present disclosure.

FIG. 6 depicts a flow diagram of an example method (400) according to example embodiments of the present disclosure. The method (400) can be implemented by a computing system having one or more computing devices, such as a vehicle computing system associated with an autonomous system 101 for an autonomous vehicle shown in FIG. 1. FIG. 6 depicts steps performed in a particular order for purposes of illustration and discussion. Those of ordinary skill in the art, using the disclosures provided herein, will understand that various steps of any of the methods described herein can be omitted, rearranged, performed simultaneously, expanded and/or modified in various ways without deviating from the scope of the present disclosure.

At (402), the method (400) includes obtaining data indicative of a trigger condition. Obtaining data indicative of a trigger condition can include detecting any condition in which it is desirable to present a user interface to allow a user to control the autonomous vehicle via interaction with the user interface. For instance, in some embodiments, obtaining data indicative of a trigger condition can include detecting that the autonomous vehicle has come to rest. In some embodiments, obtaining data indicative of a trigger condition can include detecting an obstacle impeding a vehicle door. In some embodiments, obtaining data indicative of a trigger condition can include detecting the autonomous vehicle entering a fault mode.

At (404), the method (400) can include determining a predetermined path for the autonomous vehicle in response to the trigger condition. The predetermined path can be determined to move the autonomous vehicle to a more desirable location. In some embodiments, when the trigger condition is associated with the autonomous vehicle coming to a rest, the predetermined path can be determined to be a path for moving the vehicle forward or backward a several feet (e.g., less than a car length associated with the autonomous vehicle). In some embodiments, when the trigger condition is associated with the autonomous vehicle stopping in front of an obstacle impeding opening of a vehicle door, the predetermined path can be determined to be a path for moving the vehicle forward or backward a several feet (e.g., less than a car length associated with the autonomous vehicle). In some embodiments, when the trigger condition is entering a fault mode, the predetermined path can be a path to pull the vehicle to a side of the road or other safe zone.

In some embodiments, the predetermined path can be determined using the autonomous system of the autonomous vehicle. For instance, the predetermined path can be determined by a motion planner based on map data obtained by the autonomous vehicle as well as signals from one or more sensors associated with the data acquisition system for the autonomous vehicle.

At (406), the method (400) can include providing instructions to present a user interface on a display device to allow limited control of the autonomous vehicle by a user through interaction with the user interface. The instructions can be provided to, for instance, a user device associated with a passenger of the autonomous vehicle. The instructions can be provided to, for instance, a user-facing computing device located within the autonomous vehicle. The instruction can be provided, for instance, over a network or other communication link. The instructions can provide for the display of a user interface element to control movement of the autonomous vehicle through interaction with one or more interface elements. Example user interfaces that can be presented in response to the instructions are discussed with reference to FIGS. 3 and 5.

In some embodiments, the instructions are provided to present a user interface based at least in part on a location of a passenger relative to the autonomous vehicle. For instance, in some embodiments, the instructions to present the user interface may be provided only when the passenger is located within the autonomous vehicle. In some embodiments, the instructions to present the user interface may be provided only when the passenger is located outside the autonomous vehicle, but within a threshold distance of the autonomous vehicle, such as within 10 feet of the autonomous vehicle, such as within 5 feet of the autonomous vehicle, such as within 2 feet of the autonomous vehicle.

Referring to FIG. 6 at (408), the method (400) can include receiving one or more signal(s) indicative of a user interaction with one or more interface elements presented as part of the user interface for control of the autonomous vehicle along the predetermined path. The signal(s) can be indicative of a user interaction (e.g., touching or pressing) with a first interface element and/or a second interface element presented as part of the user interface. In some instances, the signal(s) can be indicative of a user interaction (e.g., touching or pressing) with an all-clear interface element.

At (410), the method (400) includes processing the signals to determine a control action for the autonomous vehicle. For instance, the signals can be processed to determine the type of interaction with the user interface. Based on the type of interaction, a control action can be determined. The control action can be linked with the type of interaction in programming associated with the autonomous vehicle.

As an example, when the signal(s) indicate a user is interacting with a first interface element 302 and/or second interface element 304 of the user interface 300 depicts in FIGS. 3 and 5, the control action can be determined to be moving the autonomous vehicle incrementally along the predetermined path. As another example, when the signal(s) indicate that a user is interacting with the all-clear interface element 330 of FIG. 5, the control action can be determined to be moving the autonomous vehicle entirely along the predetermined path.

At (412), the method (400) includes controlling the autonomous vehicle to move along the predetermined path according to the control action. For instance, commands to various control actuators for the autonomous vehicle can be provided by the vehicle control system to control the autonomous vehicle to autonomously travel at least a portion of the way along the predetermined path. In some embodiments, manual control actuators (e.g., a steering wheel) can be locked while the autonomous vehicle is being controlled to autonomously travel along the predetermined path through interaction with one or more interface elements according to example embodiments of the present disclosure.

Figure 7:
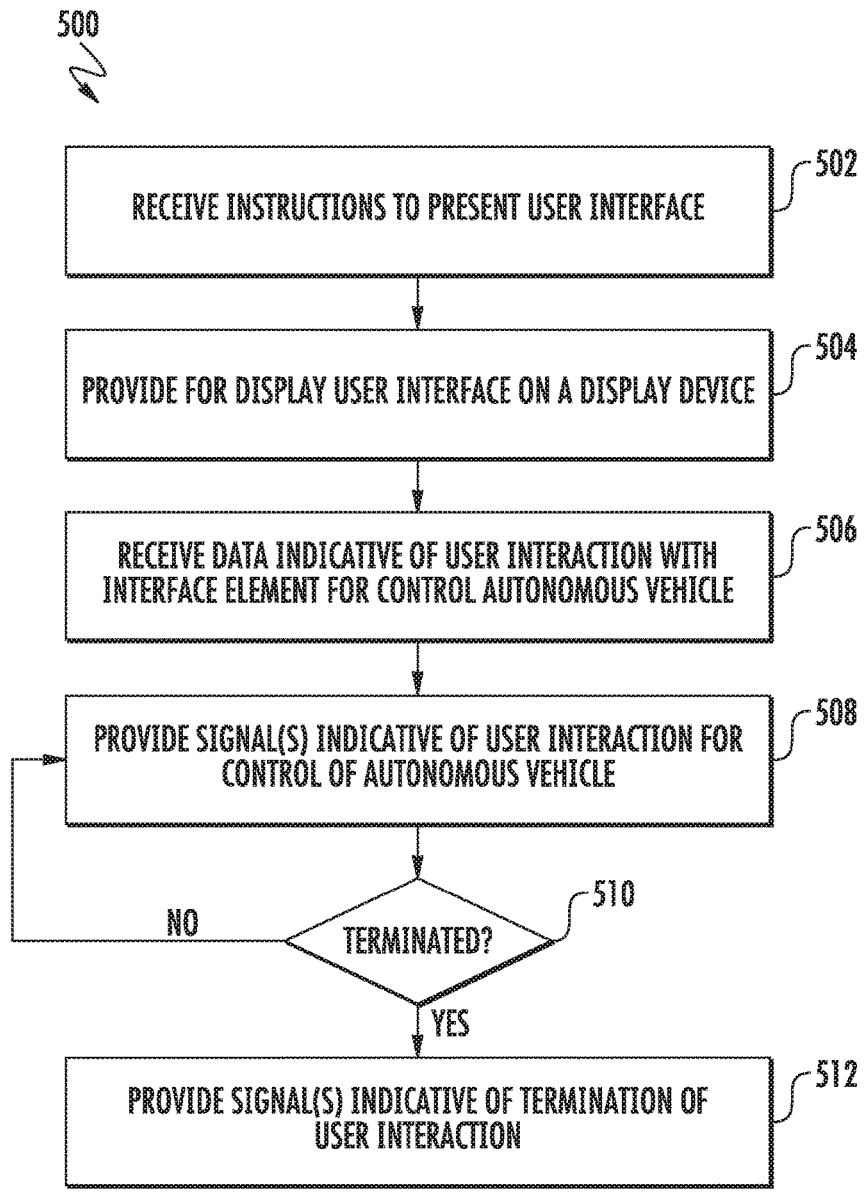
FIG. 7 depicts a flow diagram of an example method according to example embodiments of the present disclosure.

FIG. 7 depicts a flow diagram of an example method (500) according to example embodiments of the present disclosure. The method (500) can be implemented by a computing system having one or more computing devices, such as a user device 130 and/or a user-facing computing device 126 shown in FIG. 1. FIG. 7 depicts steps performed in a particular order for purposes of illustration and discussion. Those of ordinary skill in the art, using the disclosures provided herein, will understand that various steps of any of the methods described herein can be omitted, rearranged, performed simultaneously, expanded and/or modified in various ways without deviating from the scope of the present disclosure.

At (502), the method (500) can include receiving instructions to present a user interface for control of the autonomous vehicle. The instructions can be received, for instance, from a vehicle computing device associated with an autonomous system in response to obtaining data indicative of a trigger condition. The instruction can be received, for instance, over a network or other communication link.

At (504), the method (500) can include providing for display on a display device a user interface according to example embodiments of the present disclosure. The user interface can allow for the control of an autonomous vehicle through user interaction with one or more user interface elements. Example user interfaces that can be presented in response to the instructions are discussed with reference to FIGS. 3 and 5.

At (506), the method (500) can include receiving data indicative of a user interaction with one or more interface elements presented as part of the user interface for control of the autonomous vehicle. For example, data indicative of a user pressing or touching one or more of first interface element 302 and/or second interface element 304 of the example interfaces 300 depicted in FIGS. 3 and 5 can be received.

At (508), the method (500) can provide one or more signal(s) indicative of the user interaction to, for instance, an autonomous system associated with the autonomous vehicle to control the autonomous vehicle to move along a predetermined path according to example embodiments of the present disclosure. The signal(s) can be processed by the autonomous system to determine control actions for controlling the autonomous vehicle in response to the user interaction with the one or more interface elements presented as part of the user interface. The signal(s) can be provided, for instance, over a network or communication link.

At (510), the method can include determining whether the user interaction with the one or more interface elements has terminated. If not, the method can continue to provide signals indicative of user interaction with the one or more interface elements (508). When it is detected that the user interaction with the one or more interface elements has terminated at (510), the method (500) can continue to (512) where the method (500) provides signals indicative of termination of the user interaction to, for instance, the autonomous system associated with the autonomous vehicle. In response to this signal(s), the autonomous vehicle can be controlled to stop autonomous travel along the predetermined path. In this way, the autonomous vehicle can be controlled to move along the predetermined path during the time period during which the user interacts with the one or more interface elements.

FIG. 8 depicts an example computing system 600 according to example embodiments of the present disclosure. The example system 600 illustrated in FIG. 8 is provided as an example only. The components, systems, connections, and/or other aspects illustrated in FIG. 8 are optional and are provided as examples of what is possible, but not required, to implement the present disclosure. The example system 600 can include computing device(s) 601 associated with the autonomous system 101 of the vehicle 102 and, in some implementations, a remote computing system 610 including remote computing device(s) that is remote from the vehicle (e.g., the operations computing system 104 or user device 130 (not illustrated in FIG. 8) that can be communicatively coupled to one another over one or more networks 620. The remote computing system 610 can be associated with a central operations system and/or an entity associated with the vehicle 102 such as, for example, a vehicle owner, vehicle manager, vehicle share service fleet operator, service provider, etc. In some embodiments, the remote computing system 610 can be a user device 130 (not illustrated).

The computing device(s) 601 of the autonomous system 101 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 to perform operations such as any of the operations and functions of the computing device(s) 601 or for which the computing device(s) 601 are configured, as described herein. The memory 604 can store data 608 that can be obtained, received, accessed, written, manipulated, created, and/or stored. In some implementations, the computing device(s) 601 can obtain data from one or more memory device(s) that are remote from the vehicle.

The computing device(s) 601 can also include a communication interface 609 used to communicate with one or more other system(s) on-board the vehicle 102 and/or a remote computing device that is remote from the vehicle 102 (e.g., of remote computing system 610). The communication interface 609 can include any circuits, components, software, etc. for communicating with one or more networks (e.g., 620). In some implementations, the communication interface 609 can include, for example, one or more of a communications controller, receiver, transceiver, transmitter, port, conductors, software and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the autonomous system 101. The remote computing devices can include components (e.g., processor(s) 612, memory 614, instructions 616, data 618, communications interface(s) 619, etc.) similar to that described herein for the computing device(s) 601. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method of controlling an autonomous vehicle, comprising:
    providing for display to a passenger of an autonomous vehicle, by a computing system comprising one or more computing devices, a user interface on a display device, the user interface comprising at least one interface element associated with directing movement of the autonomous vehicle;
    receiving, by the computing system, a user interaction directed to the interface element;
    providing, by the computing system, one or more signals indicative of the user interaction to control the autonomous vehicle to autonomously travel along a predetermined path;
    detecting by the computing system, termination of the user interaction directed to the interface element; and
    responsive to detecting termination of the user interaction, providing, by the computing system, one or more signals to control the autonomous vehicle to stop autonomous travel along the predetermined path.

2. The method of claim 1, providing, by the computing system, one or more signals indicative of the user interaction to control the autonomous vehicle to autonomously travel along the predetermined path comprises providing, by the computing system, one or more signals indicative of the user interaction to control the autonomous vehicle to autonomously travel along the predetermined path according to a limited operating envelope.

3. The method of claim 1, wherein the at least one interface element is provided for display on the display device in response to a trigger condition.

4. The method of claim 3, wherein the trigger condition is associated with the autonomous vehicle being located next to an obstacle impeding an ability of the passenger of the autonomous vehicle to exit the autonomous vehicle.

5. The method of claim 4, wherein the predetermined path is a forward path or a backward path for the autonomous vehicle that extends less than a car length of the autonomous vehicle.

6. The method of claim 3, wherein the trigger condition is associated with the autonomous vehicle being in a fault mode.

7. The method of claim 1, wherein the predetermined path is a path for the autonomous vehicle to pull to a side portion of a road.

8. The method of claim 3, further comprising determining, by the computing system, the predetermined path in response to the trigger condition.

9. The method of claim 1, wherein the at least one interface element is provided for display based at least in part on a presence of a passenger in the autonomous vehicle.

10. The method of claim 1, further comprising providing for display, by the computing system, indicia associated with the predetermined path in the user interface.

11. The method of claim 1, wherein the at least one interface element comprises a first interface element located in a first portion of the user interface and a second interface element located in a second portion of the user interface, wherein the user interaction comprises simultaneous user interaction with the first interface element and the second interface element.

12. The method of claim 1, wherein the display device is associated with a user device carried by the passenger of the autonomous vehicle.

13. The method of claim 1, further comprising:
    providing for display, by the computing system, an all-clear interface element in conjunction with the at least one interface element;
    receiving, by the computing system, a user interaction directed to the all-clear interface element; and
    providing, by the computing system, one or more signals indicative of the user interaction directed to the all-clear interface element to control the autonomous vehicle to complete an entirety of the predetermined path without further user interaction.

14. A computing system for controlling an autonomous vehicle, the computing system comprising:
    one or more processors; and
    one or more memory devices storing computer-readable instructions that when executed by the one or more processors cause the one or more processors to perform operations, the operations comprising:
        receiving one or more signals indicative of an autonomous vehicle being in a fault mode;
        determining a predetermined path for the autonomous vehicle to move to a different location;
        providing one or more instructions to present a user interface on a display device, the user interface comprising at least one interface element associated with directing movement of an autonomous vehicle;
        receiving one or more signals indicative of a user interaction with the at least one interface element;
        controlling the autonomous vehicle to move along the predetermined path in response to the user interaction;
        detecting termination of the user interaction directed to the interface element; and
        responsive to detecting termination of the user interaction, providing one or more signals to control the autonomous vehicle to stop autonomous travel along the predetermined path.

15. The computing system of claim 14, wherein the display device is associated with a user device carried by a passenger of the autonomous vehicle or a display device located within the autonomous vehicle.

16. The computing system of claim 14, wherein the operations further comprise:
    providing for display an all-clear interface element in conjunction with the at least one interface element;
    receiving a user interaction directed to the all-clear interface element; and
    controlling the autonomous vehicle to complete an entirety of the predetermined path without further user interaction in response to the user interaction directed to the all-clear interface element.

17. An autonomous vehicle, comprising:
    an autonomous system configured to control one or more vehicle components to implement autonomous travel;
    one or more processors; and
    one or more memory devices, the one or more memory devices storing computer-readable instructions that when executed by the one or more processors cause the one or more processors to perform operations, the operations comprising:
obtaining data indicative of a trigger condition;
determining a predetermined path for the autonomous vehicle in response to the trigger condition;
providing one or more instructions to present a user interface on a display device, the user interface comprising at least one interface element associated with directing movement of the autonomous vehicle;
receiving one or more signals indicative of a user interaction with the at least one interface element;
controlling, with the autonomous system, the autonomous vehicle to move along the predetermined path in response to the user interaction;
detecting, by the computing system, termination of the user interaction directed to the interface element, and
responsive to detecting termination of the user interaction, providing, by the computing system, one or more signals to control the autonomous vehicle to stop autonomous travel along the predetermined path.

18. The autonomous vehicle of claim 17, wherein the trigger condition is associated with the autonomous vehicle being located next to an obstacle impeding an ability of a passenger of the autonomous vehicle to exit the autonomous vehicle.

19. The autonomous vehicle of claim 17, wherein the trigger condition is associated with the autonomous vehicle being in a fault mode.

* * * * *